United States Patent [19]
Zhang

[11] Patent Number: 5,962,366
[45] Date of Patent: Oct. 5, 1999

[54] TREATMENT TO IMPROVE THE DURABILITY AND SELECTIVITY OF A HYDRODECHLORINATION CATALYST AND CATALYST

[75] Inventor: Zongchao Zhang, Norwood, N.J.

[73] Assignee: Akzo Nobel N.V., Arnhem, Netherlands

[21] Appl. No.: 09/168,490

[22] Filed: Oct. 8, 1998

Related U.S. Application Data

[63] Continuation-in-part of application No. 09/022,755, Feb. 12, 1998, abandoned, which is a continuation-in-part of application No. 08/942,944, Oct. 2, 1997, abandoned, which is a continuation-in-part of application No. 08/755,759, Nov. 21, 1996, Pat. No. 5,721,189.

[51] Int. Cl.⁶ .......................... B01J 23/42; B01J 27/122; C10G 17/00; C07C 1/00
[52] U.S. Cl. .......................... 502/339; 502/25; 502/225; 502/226; 502/227; 502/231; 502/326; 502/327; 502/333; 502/334; 502/504; 208/262.1; 585/641; 585/733
[58] Field of Search .............................. 502/25, 225, 226, 502/227, 231, 326, 327, 333, 334, 339, 504; 208/262.1; 585/641, 733

[56] References Cited

U.S. PATENT DOCUMENTS

| | | | |
|---|---|---|---|
| 3,951,782 | 4/1976 | Buss | 208/139 |
| 4,716,143 | 12/1987 | Imai | 502/326 |
| 4,786,625 | 11/1988 | Imai et al. | 502/326 |
| 5,012,027 | 4/1991 | Abrevaya et al. | 585/443 |
| 5,017,541 | 5/1991 | Schmidt et al. | 502/226 |
| 5,105,032 | 4/1992 | Holbrook et al. | 570/101 |
| 5,561,096 | 10/1996 | Schoebrechts et al. | 502/330 |

*Primary Examiner*—Walter D. Griffin
*Assistant Examiner*—In Suk Bullock
*Attorney, Agent, or Firm*—Richard P. Fennelly

[57] ABSTRACT

The durability and selectivity of a supported nobel metal hydrodeclorination catalyst can be improved by treating the supported catalyst, which comprises support and catalytic noble metal, with a late transition metal halide salt, a post transition metal containing halide salt, or a combination thereof, and with an alkali metal halide, ammonium halide, or a combination thereof. Suitable late transition metal and post transition metal halides for use herein include zinc chloride, tin chloride, and cupric chloride. A suitable alkali metal halide for use herein include lithium chloride. The novel resulting supported catalyst has its noble metal component, which is in the zero valent state, predominantly residing adjacent the surface of the support in a form which is predominantly visible under a microscope having a resolution of about 5 Å. The catalyst also comprises the late transition metal, the post transition metal, or combination thereof, in the presence of the alkali metal moiety, ammonium moiety, or combination thereof.

26 Claims, No Drawings

TREATMENT TO IMPROVE THE DURABILITY AND SELECTIVITY OF A HYDRODECHLORINATION CATALYST AND CATALYST

This is a continuation-in-part of U.S. Ser. No. 09/022,755, filed Feb. 12, 1998, now abandoned, which was a continuation-in-part of U.S. Ser. No. 08/942,944, filed Oct. 2, 1997, now abandoned, which was a continuation-in-part of U.S. Ser. No. 08/755,759, filed Nov. 21, 1996, now U.S. Pat. No. 5,721,189.

BACKGROUND OF THE INVENTION

Various techniques are known for the regeneration or treatment of hydrodehalogenation or hydrodechlorination catalysts. The following are some examples of disclosures that deemed to be relevant to the present invention:

U.S. Pat. No. 4,980,324 to C. S. Kellner et al. discloses the regeneration and/or activation of a noble metal catalyst by the use of a fluorohalocarbon and/or a fluorohydrocarbon. In more recent U.S. Pat. No. 5,057,470, C. S. Kellner advocates the contacting of a hydrodehalgenation catalyst with an atmosphere comprising chlorine gas at elevated temperature for a time that is sufficient to improve the catalytic activity of the catalyst.

U.S. Pat. No. 4,374,047 of A. Bozon et al. teaches the pre-loading of a porous catalyst carrier with an aqueous solution of ammonium chloride prior to applying a coating containing platinum and/or palladium to the surface of the treated porous catalyst carrier.

More recent U.S. Pat. No. 5,105,032 to M. T. Holbrook et al. indicates that a supported platinum catalyst, which has been subjected to chloride pre-treatment, can be used in the hydrodechlorination of carbon tetrachloride to produce chloroform and methylene chloride. The types of chloride treatment that are disclosed by this patent include treatment of the catalyst with hydrochloric acid and chlorine at an elevated temperature.

The regeneration of a deactivated catalyst which is useful in the production of aromatic compounds, rather than as a hydrodechlorination catalyst, is described in European Patent Publication No. 535,619. In this patent, a deactivated catalyst containing a zeolite and a noble metal from Group VIII of the Periodic Table is treated with a variety of halogen and halogen-containing compounds including such species as hydrogen chloride, ammonium chloride, and ammonium fluoride.

In U.S. Pat. No. 5,721,189, a process for enhancing the durability of a supported nobel metal hydrodechlorination catalyst is taught which comprises treating the supported catalyst, which comprises support and catalytic nobel metal, with a non-elemental halide compound, which is not a mineral acid. A preferred halide compound for use in that invention is ammonium chloride.

SUMMARY OF THE PRESENT INVENTION

The present invention relates to a process for enhancing the durability of a supported noble metal hydrodechlorination catalyst. The process comprises treating the supported catalyst, which comprises support and catalytic noble metal, with a late transition metal halide salt, a post transition metal salt, or combination thereof and with an alkali metal halide salt, ammonium chloride, or combinations thereof. The treated catalyst is then utilized in a hydrodechlorination reaction which will demonstrate the greater durability and selectivity of the catalyst as measured by retention of desired performance for a longer period of time as compared to an untreated catalyst and the improved yield of a desired intermediate product of hydrodechlorination.

The treated catalyst of the present invention is also a novel composition of matter comprising at least one platinum group metal supported by an oxidic support wherein the metal, which is in the zero valent state, predominantly resides adjacent the surface of the support and is predominantly visible under a microscope having a resolution of about 5 Å, and which also comprises a late transition metal halide salt, a post transition metal salt, or combination thereof, and an alkali metal halide salt, or combinations thereof.

DESCRIPTION OF DETAILED EMBODIMENTS

The present invention is directed to a process for enhancing the durability and selectivity of a supported nobel metal hydrodechlorination catalyst. By the term "durability" is met that there is a substantial retention of activity, over time, as the catalyst is used in its intended manner in a hydrodechlorination reaction. For example, a conventional catalyst of the type to be described herein, which is not treated in accordance with the present invention will go from an initial conversion rate of about 90%, initially, to about 2% in about one half hour time. In contrast, the current invention, in a most preferred embodiment, will allow such a catalyst to stay at about 90% conversion for at least about fifty-six hours.

Also of significance to the present invention is the superior selectivity to $CH_3Cl$ for the catalyst of the present invention (namely, about 85% to 92%), as compared to the ammonium chloride-treated catalyst described and claimed in the above-described, U.S. Pat. No. 5,721,189 (namely, about 75% to 80%).

The type of catalyst to which the present invention relates is a supported catalyst that comprises both support and catalyst noble metal. It is well within the skill of persons of ordinary skill in the art familiar with prior art hydrodechlorination catalysts to select appropriate support materials and appropriate catalytic noble metals for use in the fabrication of appropriate supported catalysts which can be treated with the present invention.

The type of support that is preferred for purposes of the present invention, is an oxidic support. Representative supports of this type include silica, alumina, zirconia, titania, and the like. It is preferably a pelletized support. Zeolitic materials, either the naturally occurring aluminosilicate or aluminophosphate materials or the synthetic zeolites, may be selected as the oxidic support for use in connection with the present invention, if desired. These zeolites may also contain one or more transition metal additives, such as vanadium, molybdenum, titanium, manganese, zirconium, iron, and copper and/or one or more post-transition metals, such as tin.

The type of catalytic metal which forms the other component of the catalyst which is to be treated in accordance with the present invention, is preferably a Group VIII noble metal such as platinum, palladium, or mixtures thereof. It is generally present at from about 0.1% to about 5%, by weight of the support, preferably from about 0.1% to about 1%, by weight. If desired, the Group VIII nobel metal catalyst can contain other metals that are ordinarily used with catalyst of this type. Examples of other such other metals that can be contained in such a catalyst include tin, titanium, germanium, rhenium, silicon, lead, phosphorus, arsenic, antimony, bismuth, copper, silver, cobalt, or mixtures thereof.

In accordance with the present invention, the aforementioned type of supported hydrodechlorination catalyst, which is generally known to persons of ordinary skill in the art, is treated with a late transition metal halide salt, a post transition metal salt, or a combination thereof. The chlorides are preferred as the halide species to use with the late transition metal being preferably selected from Group IB of the Periodic Table of the Elements and the post transition metals being selected from Groups IIB, IIIA and IVA of the Periodic Table of the Elements (as depicted on page 662 of The Condensed Chemical Dictionary, Ninth Edition, 1977). Examples of especially suitable compounds which can be used in accordance with the present invention include zinc chloride, tin chloride, and cupric chloride.

The treatment of the supported catalyst also involves the use of an alkali metal halide salt and/or an ammonium halide salt. The chlorides are again preferred as the halide species to use. Examples of suitable compounds that can be used in accordance with the present invention include lithium chloride and ammonium chloride.

Generally speaking, the treatment of the supported catalyst can take place at temperatures ranging from about 100° C. to about 500° C., preferably from about 200° C. to about 400° C. for a sufficient length of time, for instance, from about five minutes to about twenty-four hours, preferably from about thirty minutes to about four hours in order to effect the desired degree of enhancement in the durability of the catalyst.

The previously described treatment procedure also affects the morphology of the conventional "egg-shell"-type hydrodechlorination catalyst in several major ways. The first is the conversion of the metal from a +1 formal valence state to the zero valence state, as determined by X-ray photoelectron spectroscopy. The second is a particle size growth of the metal species so that a predominant amount of such particles are visible under a microscope having a resolution of about 5 Å since they are predominantly in the particle size range of from about 10 Å to about 200 Å. Finally, the composition that is produced will contain the late transition metal and/or post transition metal treatment agent and the alkali metal and/or ammonium treatment agent.

The foregoing invention is further illustrated by the Examples that follow.

COMPARATIVE EXAMPLE 1

LiCl-Treated Catalyst

A Johnson Matthey 0.3% Pt/$Al_2O_3$ catalyst (Type 73) was treated by soaking in an aqueous solution of LiCl (0.4 g/ml) for thirty minutes. The excess LiCl solution was drained afterward. The catalyst was then dried at 100° C. for twelve hours in an oven. One gram of the dried catalyst was subsequently loaded into a glass reactor. It was first activated at 350° C. under $H_2$ flow (20 ml/min) for two hours. The catalyst was then cooled to 90° C. for $CCl_4$ hydrodechlorination. The reaction was conducted at a $H_2/CCl_4$ ratio of 7 with a hydrogen flow rate of 20 ml/min. The catalyst showed stable performance for eighteen hours with the $CCl_4$ conversion at 80% and the $CHCl_3$ selectivity at 75%.

COMPARATIVE EXAMPLE 2

$ZnCl_2$-Treated Catalyst

A Johnson Matthey 0.3% Pt/$Al_2O_3$ catalyst (Type 73) was treated by soaking in an aqueous solution of $ZnCl_2$ (0.4 g/ml) for thirty minutes. The excess $ZnCl_2$ solution was drained afterward. The catalyst was then dried at 100° C. for twelve hours in an oven. One gram of the dried catalyst was subsequently loaded into a glass reactor. It was first activated at 350° C. under $H_2$ flow (20 ml/min) for two hours. The catalyst was then cooled to 90° C. for $CCl_4$ hydrodechlorination. The reaction was conducted at a $H_2/CCl_4$ ratio of 7 with a hydrogen flow rate of 20 ml/min. The $CCl_4$ conversion was below 20%, and the catalyst was deactivated rapidly. Heavier by-products, such as $C_2Cl_6$, were formed at high selectivity (40%–56%).

EXAMPLE 3

$ZnCl_2$ and LiCl-Treated Catalyst at Lower Concentrations

A Johnson Matthey 0.3% Pt/$Al_2O_3$ catalyst (Type 73) was treated by soaking in an aqueous solution of $ZnCl_2$ (0.05 g/ml) and LiCl (0.35 g/ml) for thirty minutes. The excess solution was drained afterward. The catalyst was then dried at 100° C. for twelve hours in an oven. One gram of the dried catalyst was subsequently loaded into a glass reactor. It was first activated at 350° C. in a $H_2$ flow (20 ml/min) for two hours. The catalyst was then cooled to 90° C. for $CCl_4$ hydrodechlorination. The reaction was conducted at a $H_2/CCl_4$ ratio of 7 with a hydrogen flow rate of 20 ml/min. The catalyst showed stable performance for forty-three hours. A high selectivity to $CHCl_3$ (80%–90%) was found on this catalyst which had a $CCl_4$ conversion of 65%–80%.

EXAMPLE 4

$ZnCl_2$ and LiCl Treated Catalyst at Higher Concentrations

A Johnson Matthey 0.3% Pt/$Al_2O_3$ catalyst (Type 73) was treated by soaking in an aqueous solution of $ZnCl_2$ (0.06 g/ml) and LiCl (0.4 g/ml) for thirty minutes. The excess solution was drained afterward. The catalyst was then dried at 100° C. for twelve hours in an oven. One gram of the dried catalyst was subsequently loaded into a glass reactor. It was first activated at 350° C. under $H_2$ flow (20 ml/min) for two hours. The catalyst was then cooled to 90° C. for $CCl_4$ hydrodechlorination. The reaction was conducted at a $H_2/CCl_4$ ratio of 7 with a hydrogen flow rate of 20 ml/min. The catalyst showed stable performance for forty-nine hours. High selectivity to $CHCl_3$ (85%–92%) was found for this catalyst which had a $CCl_4$ conversion of 70%–88%.

The foregoing Examples, which are presented for illustrative purposes only, should not be construed in a limiting sense. The scope of protection sought is set forth in the claims that follow.

I claim:

1. A process for enhancing the durability and selectivity of a supported noble metal hydrodechlorination catalyst, as measured by a later hydrodechlorination reaction, which process comprises treating the supported catalyst, which comprises support and catalytic noble metal, with a halide salt selected from the group consisting of a late transition metal halide, a post transition metal halide, and a combination thereof and with a halide salt selected from the group consisting of an alkali metal halide salt, an ammonium halide salt, and a combination thereof.

2. A process as claimed in claim 1 wherein the support is an oxidic support.

3. A process as claimed in claim 1 wherein the noble metal is a Group VIII noble metal.

4. A process as claimed in claim 1 wherein the noble metal is selected from the group consisting of platinum and palladium.

5. A process as claimed in claim 1 wherein the support is an oxidic support and the noble metal is selected from the group consisting of platinum and palladium.

6. A process as claimed in claim 1 wherein the halide salt is a late transition metal halide salt selected from Group IB of the Periodic Table.

7. A process as claimed in claim 1 wherein the halide salt is a post transition metal halide salt selected from Group IIB, IIIA or IVA of the Periodic Table.

8. A process as claimed in claim 6 wherein the transition metal halide salt is chloride with the transition metal being copper.

9. A process as claimed in claim 7 wherein the post transition metal halide salt is chloride with the post transition metal being selected from the group consisting of zinc and tin.

10. A process as claimed in claim 9 wherein the transition metal is zinc.

11. A process as claimed in claim 9 wherein the transition metal is tin.

12. A process as claimed in claim 1 wherein the halide salt is lithium chloride.

13. An improved hydrodechlorination catalyst formed by the process of any of claims 1–12.

14. A supported noble metal hydrodechlorination catalyst wherein the noble metal, which is in the zero valent state, predominantly resides adjacent the surface of the support and wherein a predominant amount of the noble metal therein is visible under a microscope having a resolution of about 5 Å, and which also comprises a late transition metal, a post transition metal, or combination thereof, in the presence of an alkali metal moiety, ammonium moiety, or combination thereof.

15. A catalyst as claimed in claim 14 wherein the support is an oxidic support.

16. A catalyst as claimed in claim 14 wherein the noble metal is a Group VIII noble metal.

17. A catalyst as claimed in claim 14 wherein the noble metal is selected from the group consisting of platinum and palladium.

18. A catalyst as claimed in claim 14 wherein the support is an oxidic support, and the noble metal is selected from the group consisting of platinum and palladium.

19. A catalyst as claimed in claim 14 wherein the support is a pelletized oxidic support, and the noble metal is selected from the group consisting of platinum and palladium.

20. A catalyst as claimed in claim 14 wherein the late transition metal is selected from Group IB of the Periodic Table.

21. A catalyst as claimed in claim 14 wherein the post transition metal is selected from Group IIB, IIIA or IVA of the Periodic Table.

22. A catalyst as claimed in claim 20 wherein the late transition metal is copper.

23. A catalyst as claimed in claim 21 wherein the post transition metal is selected from the group consisting of zinc and tin.

24. A catalyst as claimed in claim 23 wherein the transition metal is zinc.

25. A catalyst as claimed in claim 23 wherein the transition metal is tin.

26. A catalyst as claimed in claim 14 wherein the alkali metal moiety is lithium.

* * * * *